United States Patent
Sakurai et al.

(10) Patent No.: US 12,142,094 B2
(45) Date of Patent: Nov. 12, 2024

(54) CENTER DEVICE, DATA DISTRIBUTION SYSTEM, AND COMPUTER PROGRAM PRODUCT FOR EXECUTING RESTRICTION ON FUNCTION OF DATA

(71) Applicant: DENSO CORPORATION, Kariya (JP)

(72) Inventors: Nao Sakurai, Kariya (JP); Yoshitaka Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 464 days.

(21) Appl. No.: 17/403,464

(22) Filed: Aug. 16, 2021

(65) Prior Publication Data

US 2021/0375079 A1  Dec. 2, 2021

Related U.S. Application Data

(63) Continuation of application No. PCT/JP2020/002967, filed on Jan. 28, 2020.

(30) Foreign Application Priority Data

Feb. 25, 2019 (JP) .................................. 2019-031596

(51) Int. Cl.
G07C 5/08 (2006.01)
(52) U.S. Cl.
CPC ......... *G07C 5/0816* (2013.01); *G07C 5/0808* (2013.01); *G07C 5/0841* (2013.01)
(58) Field of Classification Search
None
See application file for complete search history.

(56) References Cited

U.S. PATENT DOCUMENTS

| | | | |
|---|---|---|---|
| 2011/0122437 A1 | 5/2011 | Shimohira | |
| 2018/0074811 A1 | 3/2018 | Kiyama et al. | |
| 2019/0034193 A1* | 1/2019 | Fox | G06F 11/1433 |
| 2019/0163466 A1* | 5/2019 | Kiyama | H04W 4/44 |
| 2020/0125354 A1* | 4/2020 | Kim | G06F 11/0754 |

FOREIGN PATENT DOCUMENTS

| | | |
|---|---|---|
| JP | 2006-203507 A | 8/2006 |
| JP | 2009129463 A | 6/2009 |
| JP | 2010191786 A | 9/2010 |
| JP | 2010221771 A | 10/2010 |
| JP | 2011-108132 A | 6/2011 |

(Continued)

*Primary Examiner* — Abdhesh K Jha
*Assistant Examiner* — Jonathan E Reinert
(74) *Attorney, Agent, or Firm* — Harness, Dickey & Pierce, P.L.C.

(57) ABSTRACT

A center device includes a distribution control unit that is configured to control distribution of data to a plurality of vehicles; a defect detection unit that is configured to detect a defect in the data that was distributed; a restriction execution unit that is configured to cause the plurality of vehicles to restrict a function and/or performance of the data from which the defect is detected; and a grouping unit that divides the plurality of vehicles as restriction targets into groups according to contents of restriction on the function and/or performance. The restriction execution unit is further configured to cause the plurality of vehicles to restrict the function and/or performance of the data from which the defect is detected for each of the groups that are divided by the grouping unit.

12 Claims, 7 Drawing Sheets

(56) References Cited

FOREIGN PATENT DOCUMENTS

| JP | 2012137920 A | 7/2012 |
|----|--------------|--------|
| JP | 2015061130 A | 3/2015 |
| JP | 2016224503 A | 12/2016 |
| JP | 2017146934 A | 8/2017 |
| JP | 2018045515 A | 3/2018 |

* cited by examiner

FIG. 4

| TARGET | TIME | WEATHER CONDITIONS | ROAD SURFACE CONDITIONS | VEHICLE CONDITIONS 1 | VEHICLE CONDITIONS 2 | LOCATIONS |
|---|---|---|---|---|---|---|
| VEHICLE A | 12/20 19:00-20:00 | EXTREMELY HEAVY RAIN | SLIPPERY | AUTO-BRAKING 4 TIMES/HOUR | AUTO-STEERING ERROR 0 TIMES/HOUR | CITY A |
| VEHICLE B | 12/20 19:00-20:00 | HEAVY RAIN | SLIPPERY | AUTO-BRAKING 4 TIMES/HOUR | AUTO-STEERING ERROR 0 TIMES/HOUR | CITY B |
| VEHICLE C | 12/20 20:00-21:00 | EXTREMELY HEAVY RAIN | SLIPPERY | AUTO-BRAKING 3 TIMES/HOUR | AUTO-STEERING ERROR 0 TIMES/HOUR | CITY C |
| VEHICLE D | 12/25 21:00-22:00 | SNOWFALL | VERY SLIPPERY | AUTO-BRAKING 7 TIMES/HOUR | AUTO-STEERING ERROR 3 TIMES/HOUR | CITY D |
| VEHICLE E | 12/25 21:00-22:00 | HEAVY SNOWFALL | SLIPPERY | AUTO-BRAKING 7 TIMES/HOUR | AUTO-STEERING ERROR 2 TIMES/HOUR | CITY E |
| VEHICLE F | 12/25 22:00-23:00 | EXTREMELY HEAVY SNOWFALL | VERY SLIPPERY | AUTO-BRAKING 8 TIMES/HOUR | AUTO-STEERING ERROR 4 TIMES/HOUR | CITY F |

FIG. 5

| TARGET | GROUP |
|---|---|
| VEHICLE A<br>VEHICLE B<br>VEHICLE C | GROUP A |
| VEHICLE D<br>VEHICLE E<br>VEHICLE F | GROUP B |

FIG. 6

| GROUP | RESTRICTION LEVEL | MODE |
|---|---|---|
| GROUP A | AUTO-BRAKING FUNCTION: OFF<br>AUTO-STEERING FUNCTION: ON | MODE 1 |
| GROUP B | AUTO-BRAKING FUNCTION: OFF<br>AUTO-STEERING FUNCTION: OFF | MODE 2 |

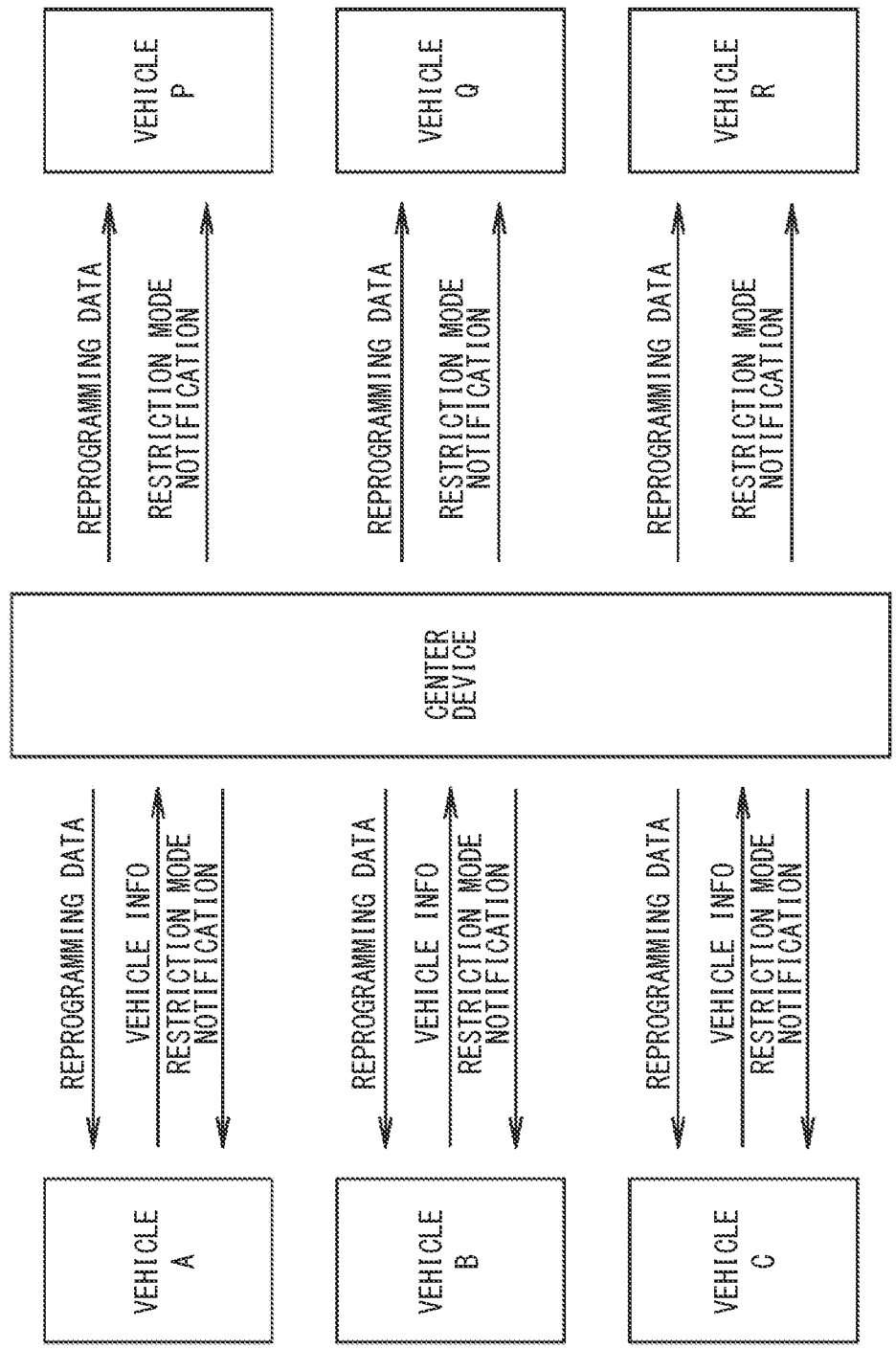

CENTER DEVICE, DATA DISTRIBUTION SYSTEM, AND COMPUTER PROGRAM PRODUCT FOR EXECUTING RESTRICTION ON FUNCTION OF DATA

CROSS REFERENCE TO RELATED APPLICATIONS

This application is a continuation application of International Patent Application No. PCT/JP2020/002967 filed on Jan. 28, 2020, which designated the U.S. and claims the benefit of priority from Japanese Patent Application No. 2019-031596 filed on Feb. 25, 2019, the disclosure of which is incorporated herein by reference.

TECHNICAL FIELD

The present disclosure relates to a center device, a data distribution systems, and a computer program product for executing restriction.

BACKGROUND

In recent years, along with development of communication network technology, connected-cars related technology is developing as well. Taking advantage of the technology of connected cars, a system where a center device wirelessly distributes data to vehicles has been provided. For example, Patent Literature 1 discloses a system where a center device wirelessly distributes reprogramming data to vehicles to update an application program of an in-vehicle electronic control unit (hereinafter, referred to as ECU (Electronic Control Unit)).

SUMMARY

According to one aspect of the present disclosure, a distribution control unit is configured to control distribution of data to a vehicle. A defect detection unit is configured to detect a defect in the data that was distributed. A restriction execution unit is configured to cause the vehicle to restrict a function and/or performance of the data from which the defect is detected.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram showing vehicle information and external information;
FIG. 5 is a diagram showing grouped targets;
FIG. 6 is a diagram showing restrictions on functions and performances;
FIG. 8 is a diagram showing distribution of a restriction mode notification.

DETAILED DESCRIPTION

Next, a relevant technology will be described only for understanding the following embodiments.

In a system where a center device distributes data to vehicles, if a defect is detected in the distributed data, the defect may cause a damage to the system. Therefore, at the center device, it is desirable to take a countermeasure that would prevent such a damage due to the defect as much as possible when a defect is detected in the distributed data.

An objective of the present disclosure is to appropriately prevent damages that would be caused by a defect when the defect is detected in the distributed data.

According to the one aspect of the present disclosure as described above, a distribution control unit is configured to control distribution of data to a vehicle. A defect detection unit is configured to detect a defect in the data that was distributed. A restriction execution unit is configured to cause the vehicle to restrict a function and/or performance of the data from which the defect is detected.

When a defect in the distributed data is detected, the vehicle is instructed to restrict a function and/or performance of the data from which the defect is detected. By instructing the vehicle to restrict the function and/or performance of the data from which the defect is detected, it is possible to appropriately prevent damages that would be caused by the defect.

Hereinafter, an embodiment of the present disclosure will be described with reference to the drawings. A data distribution system is a system where a center device wirelessly distributes data to vehicles. In the present embodiment, as an example of data distributed from the center device to the vehicle side, reprograming data for updating an application program in an in-vehicle ECU that is used for vehicle control or vehicle diagnosis is described. The reprograming data may include software necessary for hardware (a physical machine) of the ECU to control operations of the ECU by executing the application program.

Figure 1:
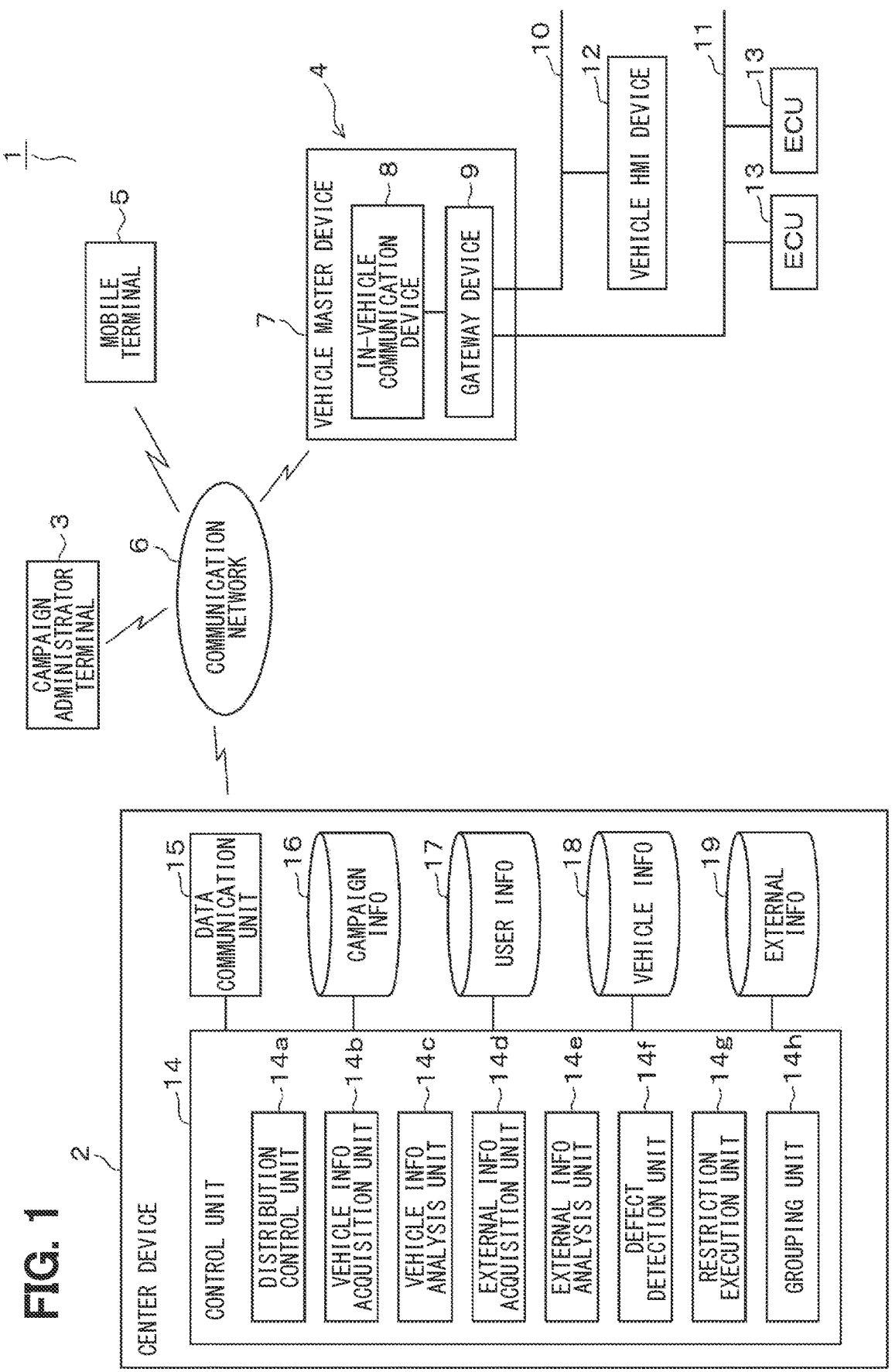
FIG. 1 is a diagram showing a configuration according to an embodiment of the present disclosure.

As shown in FIG. 1, the data distribution system 1 includes a center device 2 that distributes reprograming data to vehicles, a campaign administrator terminal 3 managed by a campaign administrator that provides the reprograming data to the center device 2, a vehicle-side system 4 mounted in a vehicle, and a mobile terminal 5 carried by a user. The mobile terminal 5 may be a smartphone or a tablet having a web browser. The center device 2, the campaign administrator terminal 3, the vehicle-side system 4, and the mobile terminal 5 are configured to communicate data with each other via a communication network 6. The communication network 6 may include a communication network compliant with LPWA (Low Power Wide Area) communication method and a communication network compliant with LTE (Long Term Evolution) communication method. The center device 2 forms a one-to-many relationship with the vehicle-side systems 4 and the mobile terminals 5. That is, the center device 2 is configured to communicate with, and distribute reprograming data to, an unspecified number of vehicle-side systems 4 and an unspecified number of mobile terminals 5.

The campaign administrator terminal 3 administrates the reprograming data distributed from the center device 2 to the vehicles. The campaign manager terminal 3 transmits campaign information to the center device 2 when a reprograming data distribution event condition is established such as an event to improve functions or to repair a bug.

When the center device 2 receives the campaign information from the campaign administrator terminal 3, the center device 2 distributes a campaign notification to the vehicle-side systems 4 and the mobile terminals 5. The campaign notification is a notification that notifies the vehicle-side systems 4 and the mobile terminals 5 of distribution of reprograming data.

The vehicle-side system 4 has a vehicle master device 7. The vehicle master device 7 has an in-vehicle communication device 8 and a gateway device 9, and the in-vehicle communication device 8 and the gateway device 9 are connected to communicate data with each other. The in-vehicle communication device 8 performs data communication with the center device 2 via the communication network 6. When the in-vehicle communication device 8 downloads reprogramming data from the center device 2, the in-vehicle communication device 8 transfers the downloaded reprogramming data to the gateway device 9.

A vehicle HMI (Human Machine Interface) device 12 is connected to the gateway device 9 via a bus 10, and various types of ECUs 13 are connected to the gateway device 9 via a bus 11. The vehicle HMI device 12 has an HMI function and also has a function of displaying various screen images and a function of receiving user operations. The bus 11 is, for example, a bus for a traveling system network, and a travelling control ECU is connected to the bus 11. The traveling control ECU may include, for example, an accelerator ECU that controls operations of an accelerator, a brake ECU that controls operations of a brake, a steering ECU that controls operations of a steering, an autonomous driving ECU that controls an autonomous driving function, and the like. The bus 11 may be, for example, a body system network bus, a multimedia system network bus, or the like, other than the traveling system network bus, and a body control ECU or a multimedia control ECU may be connected to the bus 11. The type and number of buses 11 and the type and number of ECUs 13 are not necessarily limited to the configuration as illustrated.

The gateway device 9 has a data relay function, and when reprogramming data is transferred from the in-vehicle communication device 8, the gateway device 9 distributes the transferred reprogramming data to the ECU 13 that is designated as a distribution target. When the ECU 13 receives the reprogramming data from the gateway device 9, the ECU 13 writes the received reprogramming data to a flash memory. By writing the reprogramming data to the flash memory, the ECU 13 updates an application program to improve the function of the application program and/or fix a bug.

In the above-described configuration, when the campaign notification from the center device 2 is received, each of the mobile terminal 5 and the vehicle HMI device 12 displays a campaign notification screen image to notify the user of campaign information that notifies the user that the reprogramming data can be downloaded from the center device 2. When the campaign notification screen image is displayed on the mobile terminal 5 or the vehicle HMI device 12, the user confirms the procedure for updating the application program through various screens, and can start updating the application program by inputting or selecting necessary items on the screens. That is, the user can update the application program using the mobile terminal 5 at an outside of the vehicle or using the vehicle HMI device 12 at an inside of the vehicle. That is, the user can update the application program through the vehicle HMI device 12 from the vehicle interior. On the contrary, if the user is not riding in the vehicle but has a mobile terminal 5, the user can update the application program through the mobile terminal 5. If an urgent update for the application program is required, reprogramming data may be downloaded from the center device 2 without displaying the campaign notification screen image and without taking the updating procedure for updating the application program by the user.

The center device 2 includes a control unit 14, a data communication unit 15, a campaign information storage unit 16, a user information storage unit 17, a vehicle information storage unit 18, and an external information storage unit 19. In the present embodiment, these storage units 16 to 19 are illustrated as included in the center device 2. However, these storage units 16 to 19 may be included in one or more external servers that are different from the center device 2 and the center device 2 and the external servers may communicate data with each other. The data communication unit 15 performs data communication with the campaign administrator terminal 3, the vehicle-side system 4, and the mobile terminal 5 via the communication network 6.

The campaign information storage unit 16 stores various information related to reprogramming data for distribution targets as campaign information, and also stores the reprogramming data. The campaign information includes distribution targets, a data distribution amount, a type of reprogramming data, and the like, and is stored in the campaign information storage unit 16 after transmitted from the campaign administrator terminal 3 to the center device 2. The reprogramming data is stored in the campaign information storage unit 16 after transmitted from the campaign administrator terminal 3 to the center device 2.

The user information storage unit 17 stores, as user information, various information about owners of vehicles. The user information includes a vehicle identification number (hereinafter referred to as VIN (Vehicle Identification Number)) uniquely assigned to the vehicle, a telephone number of the in-vehicle communication device 8 mounted in the vehicle, and a telephone number of the mobile terminal 5 owned by the user. The user information is stored in the user information storage unit 17 when, for example, the user performs an input operation through the vehicle HMI device 12 at the time of, for example, purchasing the vehicle and the input user information is transmitted from the vehicle master device 7 to the center device 2.

The vehicle information storage unit 18 stores various information about the vehicle as vehicle information. The vehicle information includes log information indicating a vehicle log and position information indicating a vehicle position. The vehicle log is, for example, a time of turning on the engine, a time of turning off the engine, a time of operating the accelerator and its operation amount, a time of operating the brake and its operation amount, a time of operating the steering and its operation amount, and the like. The vehicle information is stored in the vehicle information storage unit 18 when transmitted from the vehicle master device 7 to the center device 2.

The external information storage unit 19 stores various information acquired from an outside of the vehicle as external information. The external information includes, for example, map information, weather information, road information, SNS (Social Networking Service) information, and the like. The map information is stored in the external information storage unit 19 when transmitted from a map information distribution server to the center device 2. The weather information includes various information on weather such as weather itself, precipitation, snowfall, wind speed, and wind direction, and is stored in the external information storage unit 19 when transmitted from a weather information distribution server to the center device 2. The road information includes various information about roads such as road surface conditions and traffic conditions, and is stored in the external information storage unit 19 when transmitted from a road information distribution server to the center device 2. SNS information is information provided by an unspecified number of users through applications such as Facebook, Twitter (Registered Trademark), Instagram, etc. The SNS information provided from an unspecified number of users is collected by, for example, an organization that provides SNS services, and the collected SNS information is stored in the external information storage unit 19 when an operator inputs the collected SNS information into the center device 2.

The control unit 14 includes a microcomputer having a CPU (central processing unit), a ROM (read only memory), a RAM (random access memory), and the like. The controller executes a control program stored in a non-transitory tangible storage medium to perform various processes and controls the operation of the center device 2. The control programs executed by the control unit 14 include a restriction execution program. The control unit 14 includes a distribution control unit 14a, a vehicle information acquisition unit 14b, a vehicle information analysis unit 14c, an external information acquisition unit 14d, an external information analysis unit 14e, a defect detection unit 14f, a restriction execution unit 14g, and a grouping unit 14h.

The distribution control unit 14a controls distribution of reprogramming data to vehicles. The vehicle information acquisition unit 14b acquires the vehicle information stored in the vehicle information storage unit 18. When the vehicle information is acquired by the vehicle information acquisition unit 14, the vehicle information analysis unit 14c analyzes the acquired vehicle information. The vehicle information is periodically transmitted from the vehicle master device 7 to the center device 2 to periodically update the vehicle information stored in the vehicle information storage unit 18. Thus, the vehicle information analysis unit 14c analyzes the updated, new vehicle information. The external information acquisition unit 14d acquires the external information stored in the external information storage unit 19. When the external information is acquired by the external information acquisition unit 14d, the external information analysis unit 14e analyzes the acquired external information. The external information is periodically transmitted from the external information distribution server to the center device 2 to periodically update the external information stored in the external information storage unit 19. Thus, the external information analysis unit 14e analyzes the updated, new external information.

When the vehicle information is analyzed by the vehicle information analysis unit 14c and the external information is analyzed by the external information analysis unit 14e, the defect detection unit 14f creates an algorithm for detecting a defect from the analysis results, and detects a defect in the distributed reprogramming data using the created algorithm. For example, when the frequency of automatic braking by the brake ECU is high as compared to a normal operation or the frequency of occurrence of automatic steering error by the autonomous driving ECU is high as compared to a normal operation, the defect detection unit 14f detects an operation error in the brake ECU or the autonomous driving ECU, and detects a defect in the reprogramming data distributed to the brake ECU or the autonomous driving ECU.

When the defect detection unit 14f detects a defect in the distributed reprogramming data, the restriction execution unit 14g distributes a command for restricting a function and/or performance of the reprogramming data to the vehicle master device 7. When restriction on a function and/or performance of the reprogramming data (i.e., turn off the function and/or performance) is instructed by the command and when the function and/or performance can be turned off, the restriction execution unit 14g distributes, to the vehicle master device 7, the command for restricting the function and/or performance of the distributed reprogramming data when the function and/or performance of the reprogramming data is on. As a result, the vehicle master device 7 executes restriction on the function and/or performance of the reprogramming data from which a defect is detected.

The restriction execution unit 14g determines whether the vehicle is in a travelling state, and controls the vehicle master device 7 to restrict a function and/or performance according to the determination result. That is, the restriction execution unit 14g performs, when the vehicle is travelling, restriction on a function and/or performance that would not affect travelling of the vehicle even if the function and/or performance is canceled during travelling. On the contrary, the restriction execution unit 14g performs, only when the vehicle is parked, restriction on a function and/or performance that would affect travelling of the vehicle.

The grouping unit 14h groups restriction targets depending on contents of the restriction on the function and/or performance. For example, if vehicle environments are different from each other among vehicles, a probability of occurrence of a defect is different according to conditions of each vehicle. Thus, degree of risk to safety is also different for each vehicle. In view of this, the grouping unit 14h groups the restriction targets since contents of restriction on a function and/or performance are different from each other among the vehicles which have different degree of risk. After the restriction targets are grouped by the grouping unit 14h, the restriction execution unit 14g causes the vehicle master devices 7 to restrict the function and/or performance of the reprogramming data for each group.

The following will describe an operation by the above-described configuration with reference to FIGS. 2 to 8.

Figure 2:
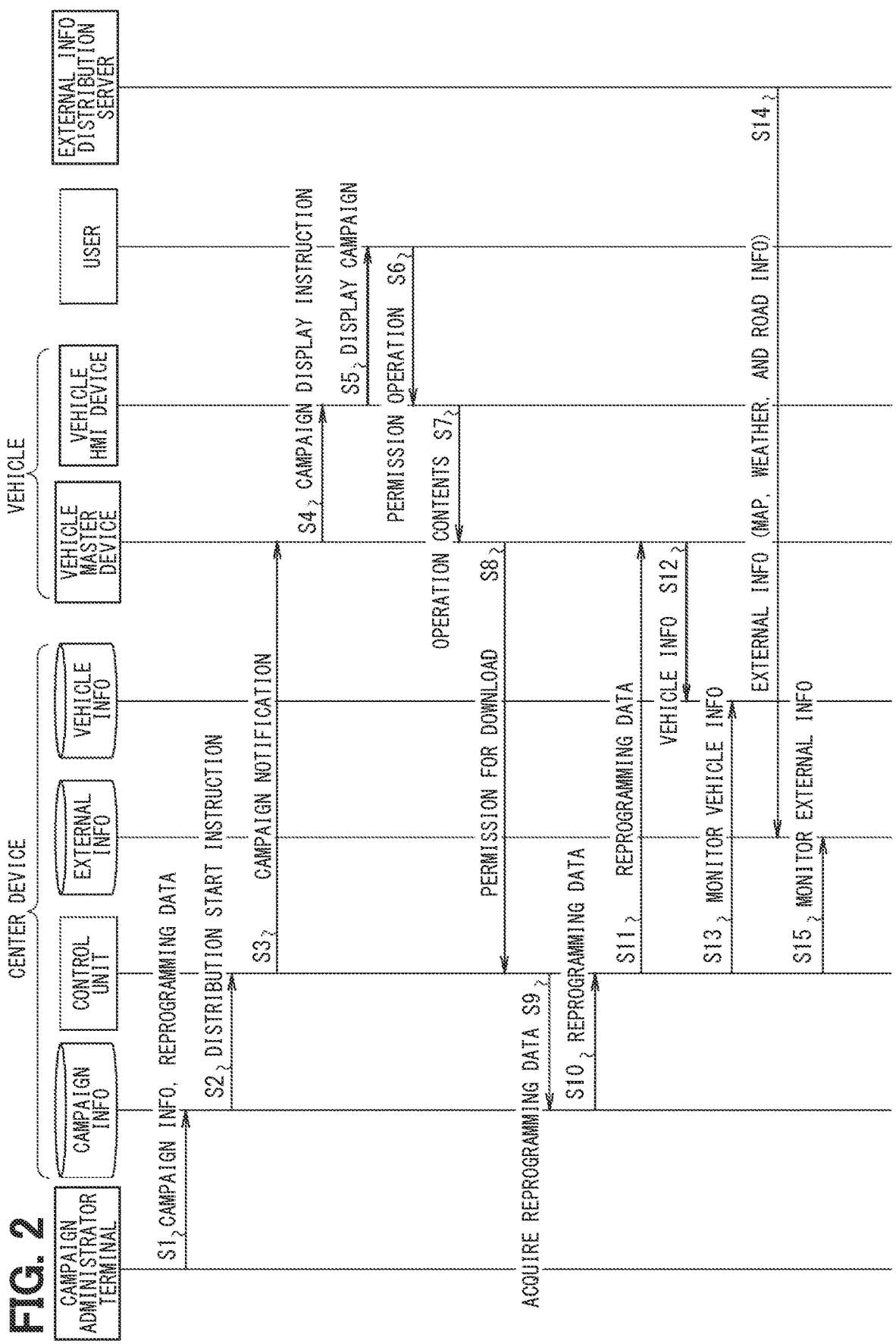
FIG. 2 is a diagram (No. 1) showing a sequence of processes.

As shown in FIG. 2, when a distribution event condition for reprogramming data is established, the campaign administrator terminal 3 transmits the campaign information and the reprogramming data to the center device 2 (S1). At the center device 2, when the control unit 14 receives the campaign information and the reprogramming data transmitted from the campaign administrator terminal 3, the control unit 14 stores the received campaign information and the reprogramming data in the campaign information storage unit 16. When the control unit 14 determines a distribution start instruction (S2), the control unit 14 distributes the campaign notification to the vehicle master device 7 (S3).

When the vehicle master device 7 receives the campaign notification distributed from the center device 2, the vehicle master device 7 transmits a campaign display instruction to the vehicle HMI device 12 (S4), and causes the vehicle HMI device 12 to display the campaign notification screen image (S5) to prompt the user to decide whether to allow download of the reprogramming data. When the user selects to allow the start of downloading the reprogramming data, the vehicle HMI device 12 transmits its operation by the user to the vehicle master device 7 (S7). When the vehicle master device 7 receives the user's operation from the vehicle HMI device 12, the vehicle master device 7 transmits a download permission instruction to the center device 2 (S8).

At the center device 2, when the download permission instruction transmitted from the vehicle master device 7 is received, the control unit 14 acquires the reprogramming data from the campaign information storage unit 16 (S9, S10), and distributes the acquired reprogramming data to the vehicle master device 7 (S11).

After downloading the reprogramming data from the center device 2, the vehicle master device 7 periodically transmits the vehicle information to the center device 2 (S12). At the center device 2, when the vehicle information transmitted from the vehicle master device 7 is received, the control unit 14 stores the received vehicle information in the vehicle information storage unit 18. The control unit 14 periodically monitors the vehicle information stored in the vehicle information storage unit 18 (S13).

The external information distribution servers including the map information distribution server, the weather information distribution server, the road information distribution server, and the like periodically transmits the map information, the weather information, and the road information as the external information (S14). At the center device 2, when the external information transmitted from the vehicle master device 7 is received, the control unit 14 stores the received external information in the external information storage unit 19. The control unit 14 periodically monitors the external information stored in the external information storage unit 19 (S15). The control unit 14 periodically monitors the vehicle information and the external information, creates an algorithm for detecting a defect by analyzing the vehicle information and the external information, and detects a defect in the distributed reprogramming data using the created algorithm.

Figure 3:
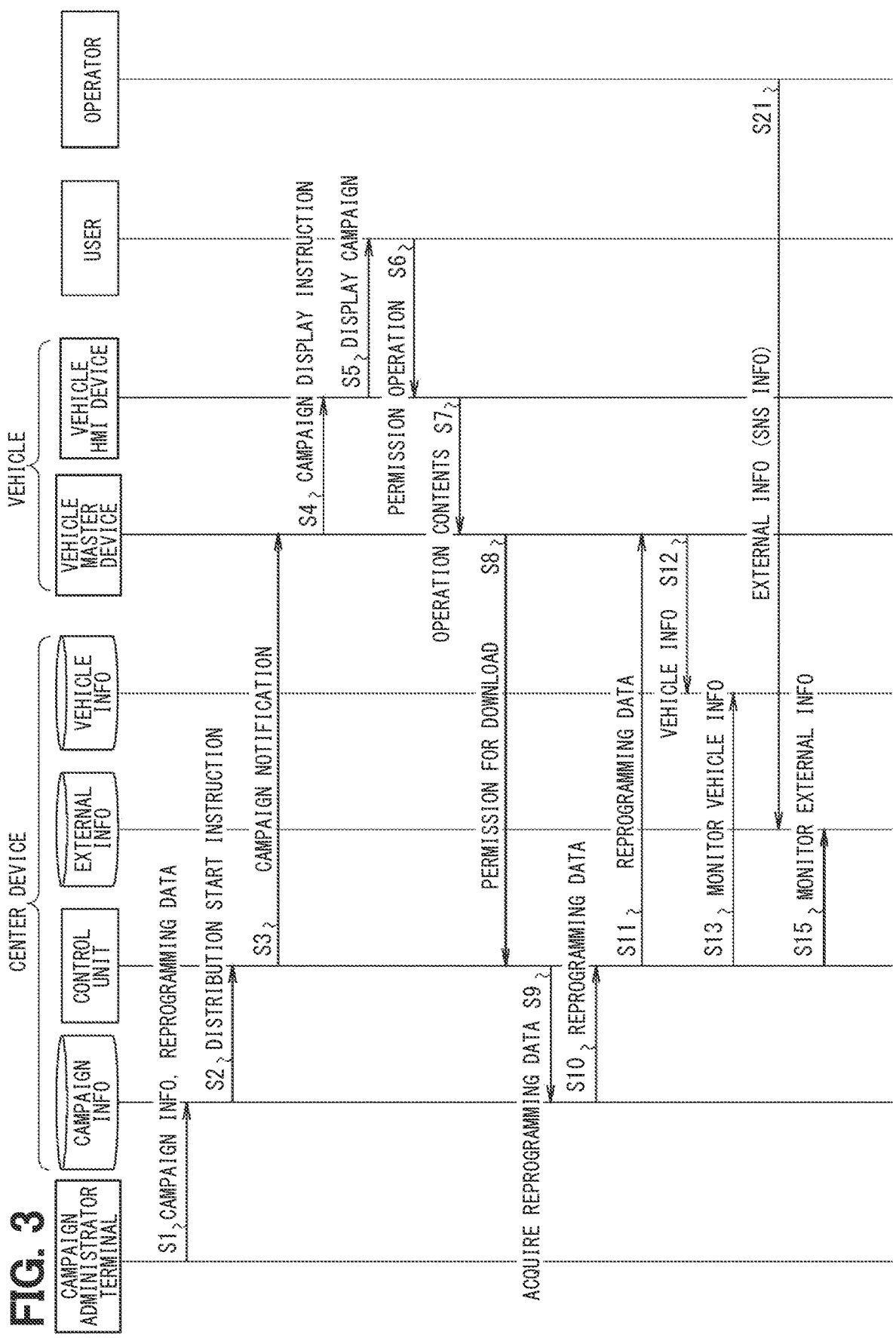
FIG. 3 is a diagram (No. 2) showing a sequence of processes.

In the above description, the map information, the weather information, and the road information are periodically transmitted from the external information distribution server to the center device 2 as external information. However, as shown in FIG. 3, SNS information provided by an unspecified number of users may be collected by an organization providing SNS services and an operator may input the collected SNS information into the center device 2 (S21).

The control unit 14 detects a defect in the distributed reprogramming data as follows. As shown in FIG. 4, the control unit 14 analyzes, for example, the relationships among time, weather conditions, road surface conditions, auto-braking operation, auto-steering error, and locations (positions) for vehicles as the vehicle information and the external information. In the example of FIG. 4, it is assumed that city A including a location of the vehicle A, city B including a location of the vehicle B, and city C including a location of the vehicle C are adjacent to each other, and city D including a location of the vehicle D, city E including a location of the vehicle E, and city F including a location of the vehicle F are adjacent to each other. That is, the weather conditions and the road surface conditions are similar to each other among cities A to C, and thus the vehicle environments of the vehicles A to C due to the weather conditions and the road surface conditions are also similar to each other. Similarly, the weather conditions and the road surface conditions are similar to each other among the cities "D" to "F", and thus the vehicle environments of the vehicles D to F due to the weather conditions and the road surface conditions are similar to each other.

The control unit 14 determines whether the tendency of the auto-braking operation status and the auto-steering error status is similar to each other among the vehicles that have similar vehicle environments and then divides the vehicles into a plurality of groups. As shown in FIG. 5, the control unit 14 categorizes the vehicles A to C having similar tendencies of the auto-braking operation status and the auto-steering error status to each other as group A. The control unit 14 also categorizes the vehicles D to F having similar tendencies of the auto-braking operation status and the auto-steering abnormality status to each other as group B.

The control unit 14 sets a restriction level for a function and/or performance based on the tendency of the auto-braking operation status and the auto-steering error status for each group to set a mode. As shown in FIG. 6, the control unit 14 sets Mode 1 for the group A where the auto-braking function is turned off and the auto-steering function is turned on, and sets Mode 2 for the group B where the auto-braking function is turned off and the auto-steering function is turned on.

Figure 7:
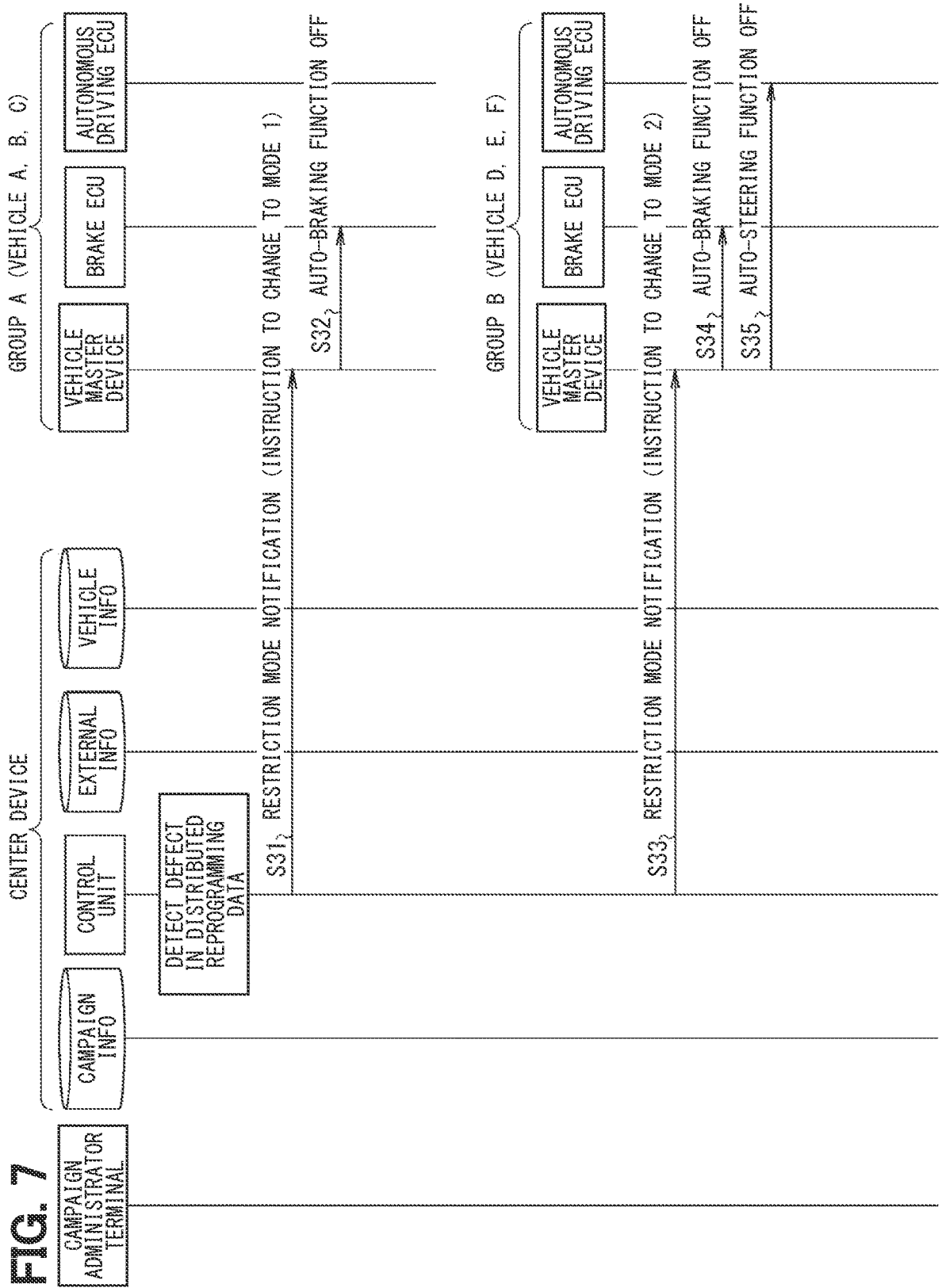
FIG. 7 is a diagram (No. 3) showing a sequence of processes.

As shown in FIG. 7, at the center device 2, when the control unit 14 detects a defect in the distributed reprogramming data (a defect detection step) and sets a mode according to the defect detection result, a restriction mode notification is distributed to the vehicle master devices 7 of the vehicles belonging to a target group (a restriction execution step). In this case, the control unit 14 distributes the restriction mode notification to the vehicle master devices 7 with the command for turning off the function and/or performance. When the vehicle master device 7 receives the restriction mode notification distributed from the center device 2, the vehicle master device 7 restricts the function and/or performance of the target ECU according to the received restriction mode notification.

Then, the control unit 14 distributes a restriction mode notification with an instruction to change the mode to Mode 1 to the vehicle master devices 7 of the vehicles belonging to the group A (S31). When the vehicle master devices 7 of the vehicles belonging to the group A receive the restriction mode notification distributed from the center device 2, each of the vehicle master devices 7 transmits an instruction to turn off the auto-braking function to the brake ECU according to the received restriction mode notification (S32), and then the brake ECU turns off the auto-braking function. In this way, it is possible to avoid a situation in advance where the brake ECU operates improperly due to the reprogramming data from which a defect is detected by turning off the auto-braking function of the brake ECU.

The control unit 14 distributes a restriction mode notification with an instruction to change the mode to Mode 2 to the vehicle master devices 7 of the vehicles belonging to the group B (S33). When the vehicle master devices 7 of the vehicles belonging to the group B receive the restriction mode notification distributed from the center device 2, each of the vehicle master devices 7 transmits an instruction to turn off the auto-braking function to the brake ECU according to the received restriction mode notification (S34) such that the brake ECU turns off the auto-braking function and also transmits an instruction to turn off the auto-steering function to the autonomous driving ECU according to the received restriction mode notification (S35) such that the autonomous driving ECU turns off the auto-steering function. In this way, it is possible to avoid a situation in advance where the brake ECU and the autonomous driving ECU operate improperly due to the reprogramming data from which a defect is detected by turning off the auto-steering function of the brake ECU and the auto-driving function of the autonomous driving ECU.

In the above, the auto-braking function of the brake ECU is turned off or the auto-steering function of the autonomous driving ECU is turned off, but another function of another ECU may be turned off. Further, at the center device 2, the restriction mode notification is distributed to each of the vehicle master devices 7 of the vehicles that have transmitted the vehicle information. However, the notification may be distributed to each of the vehicle master devices 7 of the vehicles that have not transmitted the vehicle information. As shown in FIG. 8, at the center device 2, the control unit 14 distributes the reprogramming data with the same data structure to the vehicles A to C and the reprogramming data with the same data structure to the vehicles P to R, and then receives the vehicle information from the vehicles A to C. However, even if the center device 2 does not receive the vehicle information from the vehicles P to R for some reason, the restriction mode notification may be transmitted to the vehicles P to R in addition to the vehicles A to C.

As described above, the present embodiment may provide the following technical advantages. When a defect in the distributed reprogramming data is detected at the center device 2, the vehicle is instructed to restrict a function and/or performance of the reprogramming data from which the defect is detected. By instructing the vehicle to restrict the function and/or performance of the reprogramming data from which the defect is detected, it is possible to appropriately prevent damages that would be caused by the defect.

At the center device 2, the vehicle information is acquired from the vehicle and is analyzed, and the analysis result is used to detect a defect in the distributed reprogramming data. By acquiring and analyzing the vehicle information, it is possible to detect a defect in the reprogramming data based on an actual vehicle behavior.

At the center device 2, the external information such as map information, weather information, road information, and SNS information is acquired and analyzed, and the analysis result is used to detect a defect in the distributed reprogramming data. By acquiring and analyzing the map information, the weather information, the road information, etc. as the external information, it is possible to detect, in association with the external information, a defect in the reprogramming data.

At the center device 2, by distributing a command to the vehicle that restricts a function and/or performance of the reprogramming data from which the defect is detected, the vehicle master device executes restriction on the function and/or performance of the reprogramming data. If the center device 2 distributes reprogramming data with a restricted function and/or performance to the vehicle, a distribution amount of data would increase, data communication time would increase, and the restriction on the function and/or performance would not be executed quickly. However, according to the present embodiment, since the center device 2 distributes only a command for restricting a function and/or performance to the vehicle, the data transmission amount from the center device 2 to the vehicle can be reduced, data communication time can be shortened, and the restriction on the function and/or performance can be executed quickly.

At the center device 2, the restriction targets are grouped, and the vehicle master devices for each group are instructed to execute the restriction on the function and/or performance of the reprogramming data from which the defect is detected. For example, in view of facts that the contents of restriction on a function and/or performance are different among vehicles that have different vehicle environments, the vehicle master devices 12 can execute restriction on the function and/or performance of the reprogramming data according to the vehicle environments by dividing the restriction targets into a plurality of groups.

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure.

In the above-description, a function is turned off as restriction on the function and/or performance of the reprogramming data. Alternatively, a threshold value as a criterion for turning on the function may be changed or the performance may be reduced.

The data distributed from the center device 2 to the vehicle is not necessarily limited to the reprogramming data for updating an application program of the ECU, and may be map data or the like.

In the example of FIG. 4, the weather conditions included in the weather information and the road surface conditions included in the road information are analyzed as the external information. However, if restriction on a function and/or performance is related to a road type included in the map information, the restriction targets may be grouped depending on whether the road classification is a motorway or a general road, or whether the road shape is a linear shape or a curved shape by analyzing the road type included in the map information as the external information.

The controller and the method described in the present disclosure may be implemented by a dedicated computer including a processor programmed to execute one or more functions embodied by a computer program and a memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. A center device, comprising:
   at least one processor; and
   at least one memory storing computer program code, wherein
   the at least one memory and the computer program code are configured, with the at least one processor, to serve as:
      a distribution control unit that is configured to control distribution of data to a plurality of vehicles;
      a defect detection unit that is configured to detect a defect in the data that was distributed;
      a restriction execution unit that is configured to cause the plurality of vehicles to restrict a function and/or performance of the data from which the defect is detected when the defect is detected by the defect detection unit; and
      a grouping unit that divides the plurality of vehicles as restriction targets into groups according to contents of restriction on the function and/or performance wherein vehicles as the restriction targets having similar vehicle environments are grouped into a same group, wherein
   the restriction execution unit is further configured to cause, for each of the groups that are divided by the grouping unit, a plurality of master devices of the plurality of vehicles to restrict the function and/or performance of the data from which the defect is detected; and the vehicle environments include at least one of a weather condition or a road condition.

2. The center device according to claim 1, wherein:
the at least one memory and the computer program code are further configured, with the at least one processor, to serve as:
 a vehicle information acquisition unit that is configured to acquire vehicle information from the plurality of vehicles; and
 a vehicle information analysis unit that is configured to analyze the vehicle information acquired by the vehicle information acquisition unit, wherein
the defect detection unit is configured to detect the defect in the data that was distributed using an analysis result by the vehicle information analysis unit.

3. The center device according to claim 1, wherein:
the at least one memory and the computer program code are further configured, with the at least one processor, to serve as:
 an external information acquisition unit that is configured to acquire external information; and
 an external information analysis unit that is configured to analyze the external information acquired by the external information acquisition unit, wherein
the defect detection unit is configured to detect the defect in the data that was distributed using an analysis result by the external information analysis unit.

4. The center device according to claim 1, wherein
the restriction execution unit is further configured to cause the master device of each of the plurality of vehicles to restrict the function and/or performance of the data from which the defect is detected by distributing, to each of the plurality of vehicles, a command for restricting the function and/or performance of the data from which the defect is detected.

5. The center device according to claim 1, wherein
the restriction execution unit is further configured to:
 determine whether each of the plurality of vehicles is in a travelling state; and
 cause the plurality of master devices of the plurality of vehicles to restrict the function and/or performance according to a determination result.

6. The center device according to claim 1, wherein
the vehicle environments include the road surface condition.

7. A data distribution system, comprising:
a center device that is configured to cause a plurality of vehicles to restrict a function and/or performance of data from which a defect is detected upon detecting the defect in the data that was distributed to the vehicles; and
a plurality of vehicle master devices of the vehicles each of which is configured to restrict the function and/or performance of the data from which the defect is detected, wherein
the center device comprises at least one processor and at least one memory storing computer program code,
the at least one memory and the computer program code are configured, with the at least one processor, to serve as:
 a distribution control unit that is configured to control distribution of data to the plurality of vehicles;
 a defect detection unit that is configured to detect a defect in the data that was distributed;
 a restriction execution unit that is configured to cause the plurality of vehicles to restrict a function and/or performance of the data from which the defect is detected when the defect is detected by the defect detection unit; and
 a grouping unit that divides the plurality of vehicles as restriction targets into groups according to contents of restriction on the function and/or performance wherein vehicles as the restriction targets having similar vehicle environments are grouped into a same group, wherein
the restriction execution unit is further configured to cause, for each of the groups that are divided by the grouping unit, the plurality of master devices of the plurality of vehicles to restrict the function and/or performance of the data from which the defect is detected; and
the vehicle environments include at least one of a weather condition or a road surface condition.

8. The data distribution system according to claim 7, wherein
the vehicle environments include the road surface condition.

9. A non-transitory, computer readable storage medium storing a computer program, the computer program comprising:
instructions for causing a center device to perform:
 controlling distribution of data to a plurality of vehicles;
 detecting a defect in the data that was distributed;
 causing the plurality of vehicles to restrict a function and/or performance of the data from which the defect is detected upon the defect being detected; and
 dividing the plurality of vehicles as restriction targets into groups according to contents of restriction on the function and/or performance wherein vehicles as the restriction targets having similar vehicle environments are grouped into a same group, wherein
the instructions further cause, for each of the groups that are divided by the grouping unit, a plurality of master devices of the plurality of vehicles to restrict the function and/or performance of the data from which the defect is detected; and
the vehicle environments include at least one of a weather condition or a road surface condition.

10. The non-transitory, computer readable storage medium according to claim 9, wherein
the vehicle environments include the road surface condition.

11. A center device, comprising:
at least one processor; and
at least one memory storing computer program code, wherein
the at least one memory and the computer program code are configured, with the at least one processor, to serve as:
 a distribution control unit that is configured to control distribution of data to a plurality of vehicles;
 a vehicle information acquisition unit that is configured to acquire vehicle information from the plurality of vehicles;
 a defect detection unit that is configured to detect, based on the vehicle information, a defect in the data that was distributed;
 a restriction execution unit that is configured to cause the plurality of vehicles to restrict a function and/or performance of the data from which the defect is detected when the defect is detected by the defect detection unit; and a grouping unit that is configured to divide, based on the vehicle information, a plurality of restriction targets into groups according to contents of restriction on the function and/or performance, wherein the restriction execution unit is further configured to:
determine, based on the vehicle information, the contents of restriction for each of the groups that are divided by the grouping unit; and cause, for each of the groups, a plurality of master devices of the plurality of vehicles to perform the determined contents of restriction; and the vehicle environments include at least one of a weather condition or a road surface condition.

12. The center device according to claim 11, wherein the vehicle environments include the road surface condition.

* * * * *